United States Patent [19]

Gibson et al.

[11] Patent Number: 5,757,394
[45] Date of Patent: May 26, 1998

[54] INK JET PRINT HEAD IDENTIFICATION CIRCUIT WITH PROGRAMMED TRANSISTOR ARRAY

[75] Inventors: Bruce David Gibson, Lexington; George Keith Parish, Winchester, both of Ky.

[73] Assignee: Lexmark International, Inc., Lexington, Ky.

[21] Appl. No.: 534,676

[22] Filed: Sep. 27, 1995

[51] Int. Cl.$^6$ .......................... B41J 29/393; B41J 2/14; B41J 2/16
[52] U.S. Cl. ........................................... 347/19; 347/49
[58] Field of Search ............................... 347/19, 5, 49, 347/59, 14

[56] References Cited

U.S. PATENT DOCUMENTS

| | | | |
|---|---|---|---|
| 3,852,563 | 12/1974 | Bohorquez et al. | 219/216 |
| 4,411,540 | 10/1983 | Nozaki et al. | 400/175 |
| 4,689,494 | 8/1987 | Chen et al. | 307/202.1 |
| 4,695,853 | 9/1987 | Hackleman et al. | 346/140 |
| 4,716,421 | 12/1987 | Ozawa et al. | 346/140 |
| 4,719,477 | 1/1988 | Hess | 346/140 |
| 4,803,500 | 2/1989 | Milbrandt | 346/140 |
| 4,853,718 | 8/1989 | ElHatem et al. | 346/140 |
| 4,872,027 | 10/1989 | Buskirk et al. | 346/140 |
| 4,899,180 | 2/1990 | Elhatem et al. | 346/140 |
| 4,902,244 | 2/1990 | Endo et al. | 439/489 |
| 4,930,915 | 6/1990 | Kikuchi et al. | 400/175 |
| 4,947,192 | 8/1990 | Hawkins et al. | 346/140 |
| 4,963,897 | 10/1990 | Kattner | 346/140 |
| 5,033,887 | 7/1991 | Bauerle | 400/175 |
| 5,049,904 | 9/1991 | Nakamura et al. | 346/140 |
| 5,103,246 | 4/1992 | Dunn | 346/140 |
| 5,144,336 | 9/1992 | Yeung | 346/76 |
| 5,235,351 | 8/1993 | Koizumi | 346/140 |
| 5,289,210 | 2/1994 | Takayanagi | 346/140 |
| 5,363,134 | 11/1994 | Barbehenn et al. | 347/49 |

FOREIGN PATENT DOCUMENTS

| | | |
|---|---|---|
| 0 378 439 A2 | 1/1990 | European Pat. Off. |
| 0 571 093 A2 | 4/1993 | European Pat. Off. |

OTHER PUBLICATIONS

"Integrating the Printhead into the HP DeskJet Printer" by J. Paul Harmon and John A. Widder; Hewlett–Packard Journal, Oct. 1988; pp.62–66.

*Primary Examiner*—Benjamin R. Fuller
*Assistant Examiner*—Thinh Nguyen
*Attorney, Agent, or Firm*—John J. McArdle, Jr.

[57] ABSTRACT

An ink jet print head identification system for providing print head identifying information to the electronics of an ink jet printer includes one or more programmable drain transistors integrated onto a print head chip. Existing address lines that interconnect the printer electronics and print head electronics are used to serially read the digital contents of each programmed transistor. The printer electronics reads each bit by combinationally applying a pull up voltage on two of the address lines while pulling down the voltage on one address line. If the drain of the transistor being read is programmed as an electrically conducting short, then the transistor will turn on and the voltage level on one of the pulled up address lines will not reach a logic high. If the drain is programmed as a non-conducting gap, the transistor will not conduct and the voltage level on both pulled up lines reach a logic high. The printer electronics detects whether the voltage level on both lines is a logic high and accordingly determines the digital contents of the identification circuit. After each bit has been read, the printer electronics determines print head identifying information based on the bit pattern that was retrieved from the identification circuit.

16 Claims, 4 Drawing Sheets

Bit 92 Out     Bit 94 Out     Bit 96 Out     Bit 90 Out

Fig. 7

INK JET PRINT HEAD IDENTIFICATION CIRCUIT WITH PROGRAMMED TRANSISTOR ARRAY

TECHNICAL FIELD

The present invention relates to an ink jet print head identification circuit and method. More particularly, it relates to an ink jet print head identification circuit that employs a programmed transistor array for serially transmitting a digital print head identification code to an ink jet printer controller.

BACKGROUND

Ink jet type printers employ a printing head that consists of a series of nozzles, or orifices positioned in an orifice plate for expelling ink onto a printing surface. The ink can be expelled by a variety of means, including continuous, piezoelectric, and thermal/bubble jet. While several different ink jet technologies have evolved over the past two decades, the most popular ink jet technology today is the bubble jet where ink within a chamber is locally superheated to form an expanding bubble which propels a drop of ink through an orifice and onto the printing surface. Piezoelectric printers function in a similar manner inasmuch as ink is expelled through an orifice. However, instead of boiling the ink in a chamber, the ink is essentially squeezed from the chamber as a result of deflections/expansions generated by a piezoelectric ceramic transducer. The ceramic transducer changes its physical dimensions when subjected to an electric field, thereby generating a pressure wave within the ink chamber and expelling an amount of ink through the chamber orifice. Both piezoelectric and bubble-jet methodologies are considered "drop-on-demand" or "impulse" technologies, i.e., a drop of ink is ejected from the print head only when desired.

Each type of ink jet print technology requires its own unique type of print head, and print heads may further vary based on parameters such as whether the print head contains only black ink, or whether it is capable of color printing. Generally, the different types of print heads are interchangeable, except that most printers are unable to accommodate both black ink and color due to physical differences between the print heads, i.e., print heads designed for color printing are typically larger to accommodate a variety of ink colors. Other print head parameters include architecture, resolution, number of ink jet nozzles, and spacing between the nozzles. Because print heads are interchangeable, the printer electronics must know what particular type of print head is installed, as well as information relating to the various print head parameters, so that algorithms within the printer control system can be reconfigured to provide appropriately formatted print commands to the print head electronics.

Therefore, it is desirable to provide the printer electronics with information relating to the characteristics of the particular print head that is installed. This can be done by digitally encoding the identifying information into the print head electronics and enabling the printer electronics to retrieve that information as it is needed.

A number of attempts have been made in the prior art to provide print head identifying information to the printer electronics. U.S. Pat. No. 4,872,027 to Buskirk et al. discloses providing extra electrical contact pads on the resistor network/array which fires the nozzles of the print head. These contact pads are selectively electrically connected in the resistor network to fire the individual nozzles in one of several unique configurations, each of which defines a specific print head. The code provided by these unique configurations of the electrical pads is detectable by the printer so that the type of head installed is determinable. This is accomplished by selectively connecting the individual electrical pads (or not connecting them) to the resistor circuits or circuit traces. By individually toggling the resistor lines at high or low voltage levels and detecting a voltage level shift on the lines associated with the extra contact pads, a connection (or lack thereof) may be detected.

Other prior art approaches to providing print head identifying information to the printer disclose identification circuitry disposed in the print head. U.S. Pat. No. 4,930,915 to Kikuchi et al. discloses one such print head identification means disposed in a print head. In one embodiment, a 24-pin print head is identified when the printer electronics read a "high" state value on a signal line interconnecting the printer electronics and identification means. A 9-pin print head is identified by a "low" state signal. In another embodiment of the Kikuchi invention, a parallel-serial converter produces a predetermined identification signal.

U.S. Pat. No. 5,363,134 to Barbehenn et al. discloses an integrated circuit for use in the print head of an ink jet printer. The integrated circuit includes an array circuit having a plurality of resistor cells arranged into rows and columns for heating an ink reservoir to produce a pattern of ink jets. A corresponding number of row and column lines are coupled to the array circuit for selecting and energizing the resistor cells according to the desired print pattern. An identification circuit is integrated into the same substrate as the array circuit. The identification circuit is programmable by means of a plurality of programmable paths corresponding and coupled to each row line. These programmable paths each include a programmable fuse and an active device connected in series.

The opposite ends of the programmable paths are coupled together at a common node, which in turn is coupled to an output circuit for providing a single serial output signal in response to a sequential polling of the row lines. As each row line is sequentially polled, a single output is formed by multiplexing the output of the identification circuit with analog temperature information being provided to the printer electronics by a temperature sense circuit. In this manner, Barbehenn requires an output line that is separate and distinct from any of the row lines that it uses.

Thus, there is a need for a print head identification circuit and system that enables the contents of the identification circuit to be read by the printer electronics over the existing print head array address lines.

SUMMARY

In accordance with a preferred embodiment of the present invention an identification system for providing ink jet print head identifying information in ink jet printers is disclosed. The system employs a plurality of address lines for transmitting signals such as voltages. A supply circuit provides a pull up voltage on a first address line and a second address line. A third address line in series connection with the second address line is at a logic low voltage level and provides a return for current flowing through the second address line. A programmed identification circuit is connected to the first, second, and third address lines. If the identification circuit is programmed with a first content, the identification circuit will prevent the second address line from reaching a logic high voltage level when the supply circuit pulls up the voltages on the first and second address lines. If the identification circuit is programmed with a second content, the identification circuit will allow the second address line to reach a logic high voltage level when the supply circuit pulls up the voltages on the first and second address lines. A detector is connected to the second address line for detecting whether the identification circuit is programmed with the first content or the second content by determining whether the voltage level on the second address line is a logic high or a logic low.

In one form of a preferred embodiment, the identification circuit includes an electronic switch having a gate connected to the first address line for turning the switch on when the supply circuit applies a pull up voltage to the first address line. A bit is connected to the switch as well as the second address line. The bit can be either an electrically conducting short or a non-conducting gap where the condition of the bit as a short or a gap determines whether the voltage level on the second address line is a logic high or a logic low.

In accordance with another aspect of a preferred embodiment, the supply circuit applies a pull up voltage to a plurality of first and second address lines according to a predetermined pattern of corresponding first and second address lines. There are a plurality of third address lines, each of which is in series connection with a unique one of the second address lines to form a plurality of first, second, and third address line combinations. Each third address line provides a return for current flowing through its corresponding second address line. The identification circuit is connected to each of the first, second, and third address line combinations. The detector is connected to each of the second address lines and detects, for each of the address line combinations, whether the identification circuit is programmed with the first content or the second content.

In accordance with more detailed aspects of a preferred embodiment, an identification system provides ink jet print head identifying information in ink jet printers having ink jet print heads. The system includes a controller and drive circuit for transmitting signals. A plurality of address lines transmit signals from the controller and drive circuit to the ink jet print head. A plurality of electronic switches are connected to the address lines, including a first electronic switch having a gate connected to a first address line for receiving a signal to turn the electronic switch on and off. A plurality of bits are provided, including a first bit connected to the first electronic switch and connected to a second address line. The first bit is either an electrically conducting short or a non-conducting gap with the condition of the first bit as a short or a gap being at least part of a code corresponding to the ink jet print head identifying information. A third address line is connected to the first electronic switch. The first electronic switch and the first bit are connected to form a series connection between the second and third address lines when the gate of the first switch is made active by a logic high voltage on the first address line if the bit is a short. A pull up circuit selectively applies a pull up voltage on selected ones of the address lines, and a pull down circuit selectively applies a pull down voltage on selected address lines. The controller is connected and programmed to control the pull up and pull down circuits to apply a pull up voltage on the first and second address lines and a pull down voltage on the third address line so that the switch is turned on and a voltage is placed across the series connection of the switch and the bit. A detector detects a current flow in the second address line and produces an output corresponding to the current flow or absence of current flow in the second address line. The controller receives the output of the detector and determines the condition of the bit, as a gap or a short, based on the detector output. The controller also determines the print head identifying information based in part on the condition of the bit.

This embodiment may further include a second electronic switch having a gate connected to a fourth address line for receiving a signal to turn the second electronic switch on and off. A second bit is connected to the second electronic switch and connected to a fifth address line. As with the first bit, the second bit is either an electrically conducting short or a non-conducting gap with the condition of each bit as a short or gap being at least part of the code corresponding to the ink jet print head identifying information. A sixth address line is connected to the second electronic switch, where the second electronic switch and second bit form a series connection between the fifth and sixth address lines. The controller is connected and programmed to control the pull up and pull down circuits to apply a pull up voltage on the fourth and fifth address lines and a pull down voltage on the sixth address line to turn on the second electronic switch and place a voltage across the series connection of the second electronic switch and second bit. At least the first and fourth address lines are different so that the first and second electronic switches are separately controllable by the controller and are turned on at different times. The detector sequentially detects a current flow in the second and fifth address lines and sequentially produces an output corresponding to the current flow or absence of current flow in the second and fifth address lines. The controller receives the output of the detector and determines the conditions of the first and second bits, as gaps or shorts, based on the detector output. The controller also determines the print head identifying information based in part on the conditions of the first and second bits.

There is further disclosed an ink jet print head identification circuit integrated onto an ink jet print head cartridge chip for providing identifying information relating to the characteristics of the print head to the electronics of an ink jet printer. The chip has print head array electronics connected to a plurality of address lines with each address line connected to a separate pull up device within the printer electronics. The identification circuit includes a plurality of programmed electronic switches and a plurality of bits. Each of the bits are connected to a unique one of the switches and connected to a unique one of the address lines where each bit is either an electrically conducting short or a non-conducting gap. The condition of each bit as a short or a gap determines the programming of each switch. Each of the electronic switches is interconnected with other electronic switches and address lines so that the bit corresponding to each electronic switch is read by the printer electronics from the unique one of the address lines in response to applying a pull up voltage to at least two of the address lines.

A preferred method is disclosed for providing ink jet print head identifying information to an ink jet printer having printer electronics and an ink jet print head. The print head includes an integrated circuit having print head array electronics, an identification circuit, and a plurality of address lines interconnecting the identification circuit and printer electronics. The method includes the steps of programming a digital code having one or more bits into the identification circuit. Each bit of the code is programmed as either an electrically conducting short or a non-conducting gap. The digital code corresponds to the print head identifying information. The digital code is transmitted in sequential fashion to a bit detector where each bit of the digital code is transmitted by applying a pull up voltage to two of the address lines to produce two pull up address lines. The voltage level on a third address line that is in series connection with one of the two pull up address lines is pulled down. The voltage level on one of the two address lines is detected to determine whether the voltage level on that address line is a logic high or a logic low. Transmission of the digital code is completed by outputting a signal corresponding to whether the voltage level on one of the pull up address lines is a logic high or a logic low. The condition of the bit is read, as a gap or a short, by the printer electronics based on the detector output.

As an additional step in this preferred method, the printer electronics may determine the print head identifying information based on the condition of each bit.

BRIEF DESCRIPTION OF THE PREFERRED EMBODIMENT

The preferred embodiment of the invention will now be described in further detail with reference to the drawings wherein like reference characters designate like or similar elements throughout the several drawings as follows.

DETAILED DESCRIPTION OF THE PREFERRED EMBODIMENT

Figure 1:
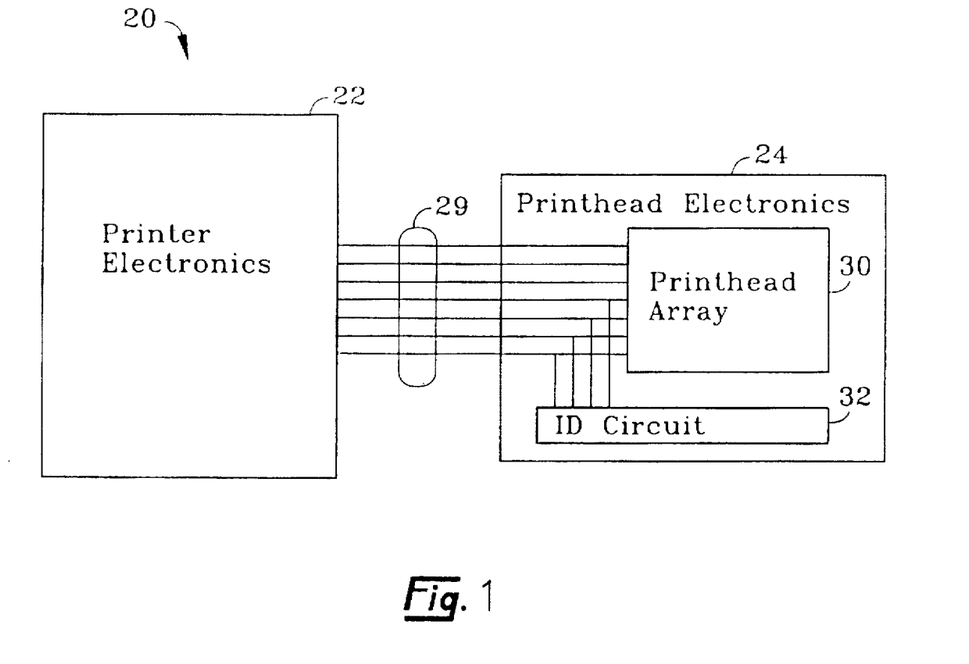
FIG. 1 is a block diagram of the print head identification system.
Figure 3:
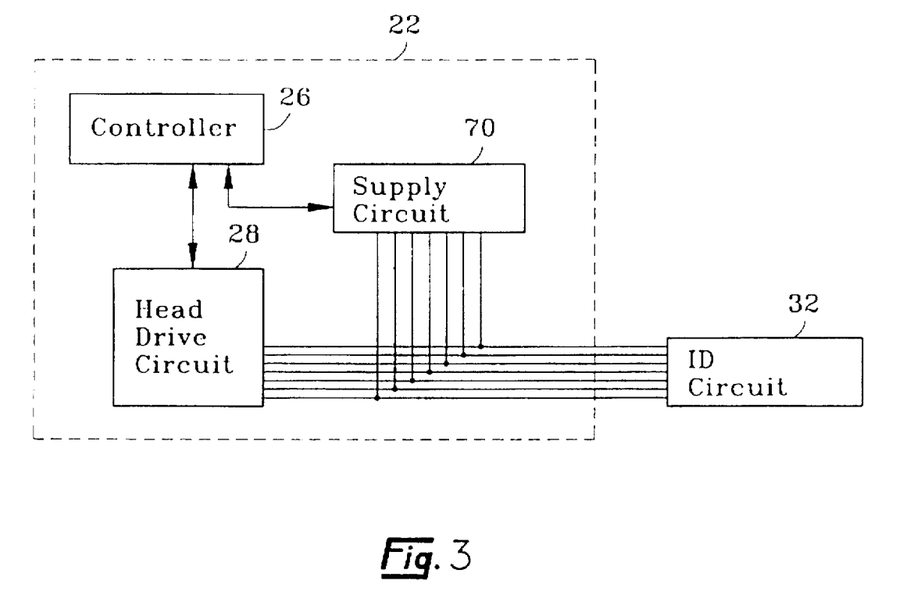
FIG. 3 is a block diagram illustrating how the supply circuitry of the printer electronics interfaces with the identification circuit.

In accordance with a preferred embodiment of the present invention, there is shown in FIG. 1 a block diagram of an ink jet print head identification system 20 including ink jet printer electronics 22 and ink jet print head electronics 24. Typically, bubble jet print heads incorporate a resistor array, or print head array 30 for selectively boiling and expelling ink through orifices in an orifice plate (not shown) on the print head. Resistors within the array 30 are selectively energized through print signals received from the printer electronics 22 on address lines 29 that interconnect the printer electronics 22 and print head electronics 24. Within the printer electronics 22 a microprocessor controller 26 (FIG. 3), which is typically an ASIC controller providing TTL level outputs, sends print data commands to a head drive circuit 28 (FIG. 3). In a preferred embodiment, the drive circuit 28 is a TEXAS INSTRUMENTS OPEN-COLLECTOR driver.

Print signals are in the form of appropriately formatted analog pulses. These analog pulses possess sufficient intensity to heat the resistors within the print head array 30 so that ink within the print head boils to form a bubble, thereby expelling ink through an orifice. The number of address lines 29 available will vary depending on the particular printer that is used.

Because different styles and types of ink jet print heads requiring differently formatted analog pulses are interchangeable in ink jet printers, it is important for the printer electronics 22 to possess information relating to the print head that is installed in the printer. Print head parametric information is useful to the printer electronics 22 because it allows the printer electronics 22 to reconfigure print control algorithms to produce analog pulses that are appropriate for the specific print head installed.

The present invention provides print head identifying information to the printer electronics 22 by encoding the information in digital format in an identification (ID) circuit 32 that is integrated into the print head electronics 24. Preferably, the digital information is encoded during fabrication of the print head electronics 24 as part of an integrated circuit. The printer electronics 22 are programmed to read the encoded information by combinationally pulling up the voltage levels on at least two of the address lines 29 while pulling down the voltage level on at least a third address line. By detecting, for each combination of pulled up and pulled down address lines, whether one of the pulled up address lines failed to reach a logic high voltage level, the printer electronics 22 read the digital contents of the ID circuit 32. In this manner, the digital contents of the ID circuit 32 for the present invention can be read over the address lines 29, thereby minimizing I/O requirements. In a preferred embodiment, the printer electronics 22 will read the contents of the ID circuit 32 when there is a "power on reset" or when a print head is changed.

To further minimize I/O requirements, the ID circuit 32 of the present invention utilizes existing address lines 29 to enable the printer electronics 22 to read the contents of the ID circuit 32. Assuming there are at least three address lines 29, the number of programmed bits within the ID circuit 32 can be any number up to the number of address lines 29. More specifically, for three or less encoded bits of identifying information, three and only three address lines 29 are required. For each bit over three, an additional address line 29 is required. For example, a four bit code requires four address lines 29, a five bit code requires five address lines 29, and a six bit code requires six address lines 29.

Figure 2:
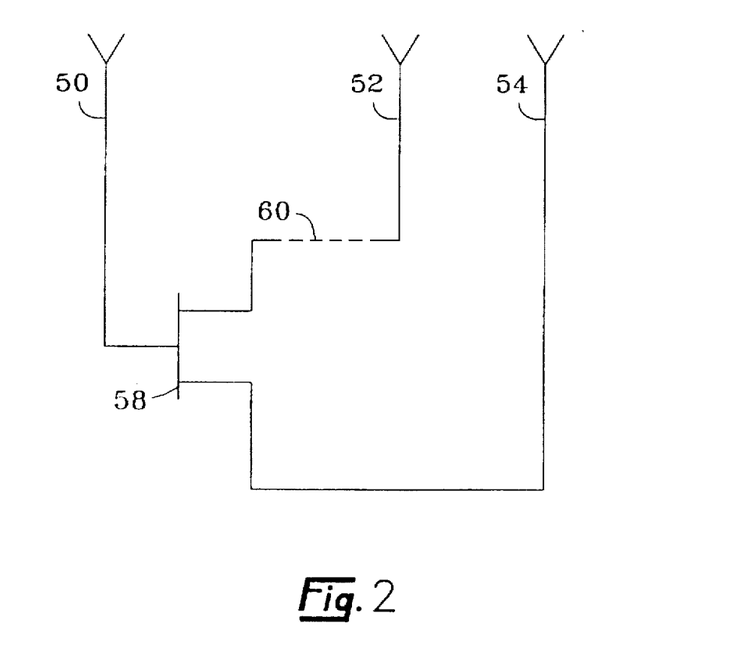
FIG. 2 is a circuit diagram for a one bit embodiment of the present invention.

Referring to FIG. 2, for each encoded bit of identifying information, the identification circuit 32 includes a transistor 58 (electronic switch) with a programmable drain (bit 60) connected to a print head array address line 29. For a given embodiment, each transistor's gate, drain, and source are connected to a unique combination of address lines 29, as shown in the one bit embodiment of FIG. 2. Although programmable drain transistors are used in the preferred embodiment, it will be understood that a transistor having a programmable source or other active devices can be used instead.

With continued reference to FIG. 2, a preferred embodiment of the present invention employs a programmable drain transistor 58 connected to three address lines 50, 52, and 54. The programmable drain, or bit 60, is either an electrically conducting short for representing one logic state, or the bit 60 is a non-conducting gap for representing a different logic state. For example, the bit 60 might be given a digital value of one "1" when the bit 60 is a short and a zero "0" when it is a gap. Address line 50 is connected to the gate of transistor 58 and attempts to switch transistor 58 on and off in response to electrical excitation on line 50 so that when a pull up voltage is applied to lines 50 and 52 and bit 60 is a short, transistor 58 is active and will conduct current from address line 52 to address line 54.

Figure 7:
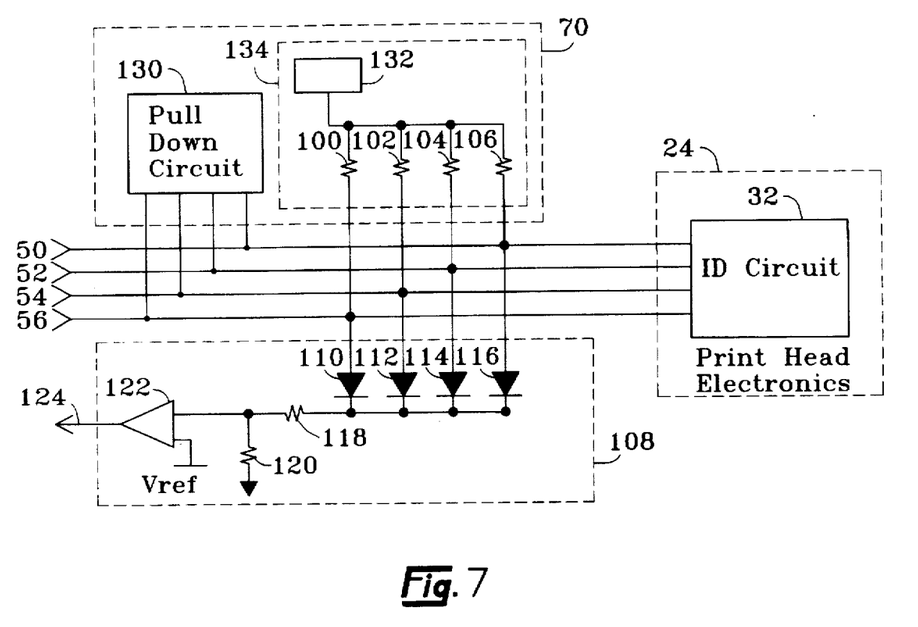
FIG. 7 is a circuit diagram of the supply circuit and detector, and illustrating how each interfaces with the address bus.

To read the bit 60 a pull up voltage is applied to, lines 50 and 52 by a pull up circuit 134 (FIG. 7) within the printer electronics 22. For each line 50 and 52 that a pull up voltage is applied to, the pull up circuit 134 provides a pull up load device, such as a resistor 100 (FIG. 7). The voltage level on line 54 is pulled down to a logic low by a pull down circuit 130 (FIG. 7) also located in the printer electronics. For each line that will be pulled down, the pull down circuit 130 simply connects that line to ground. The pull up and pull down circuits 134, 130 are collectively termed a supply circuit 70 which is illustrated in block form in FIG. 3.

Referring again to FIG. 2, with pull up voltages applied to lines 50 and 52 and line 54 pulled down, the gate of transistor 58 is charged by the applied voltage from line 50 and transistor 58 becomes active. If the bit 60 is a short, transistor 58 turns on and current flows through the load device on line 52, then through transistor 58, and returned on line 54. This prevents the voltage on line 52 from reaching a logic high level which the printer electronics 22 will detect, or read. If the bit 60 is a gap, transistor 58 will not turn on and line 52 will reach a logic high voltage level which the printer electronics 22 will also read. The printer electronics 22 are programmed to determine print head identifying information based in part on the condition of the bit 60 as being either a short or a gap.

Figure 4:
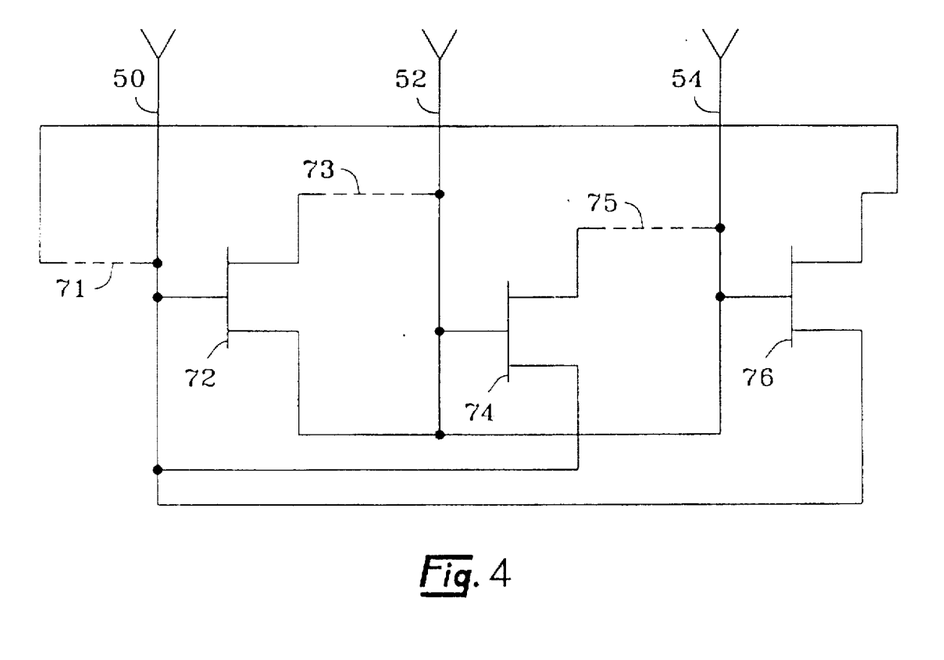
FIG. 4 is a circuit diagram for a three bit embodiment of the present invention.

A three bit embodiment of the present invention is shown in FIG. 4. In this embodiment, three programmable drain transistors 72, 74, and 76 with programmed bits 71, 73, and 75 are connected as shown so that the number of address lines 50, 52, and 54, bits 71, 73, and 75, and transistors 72, 74, and 76 are the same. Within the supply circuit 70 (FIG. 3), each of the address lines 50-54 is attached to a pull up device, and each address line 50-54 is connected for being pulled down by the supply circuit 70. To read bit 73, a pull up voltage is applied to lines 50 and 52 and the voltage level on line 54 is pulled down to a logic low. If bit 73 is shorted, transistor 72 will conduct, preventing line 52 from reaching a logic high voltage level. If bit 73 is a gap, transistor 72 will not conduct and the printer electronics 22 will detect a logic high voltage level on both of lines 50 and 52. To read bit 75, a pull up voltage is applied to lines 52 and 54 and the voltage on line 50 is pulled down to a logic low. The condition of bit 75 is reflected on line 54 as either a voltage drop (short) or no change in voltage (gap). Similarly, the condition of bit 71 as either a short or a gap is read by the printer electronics 22 on line 50 by applying a pull up voltage to lines 50 and 54 while pulling down the voltage level on line 52.

Figure 5:
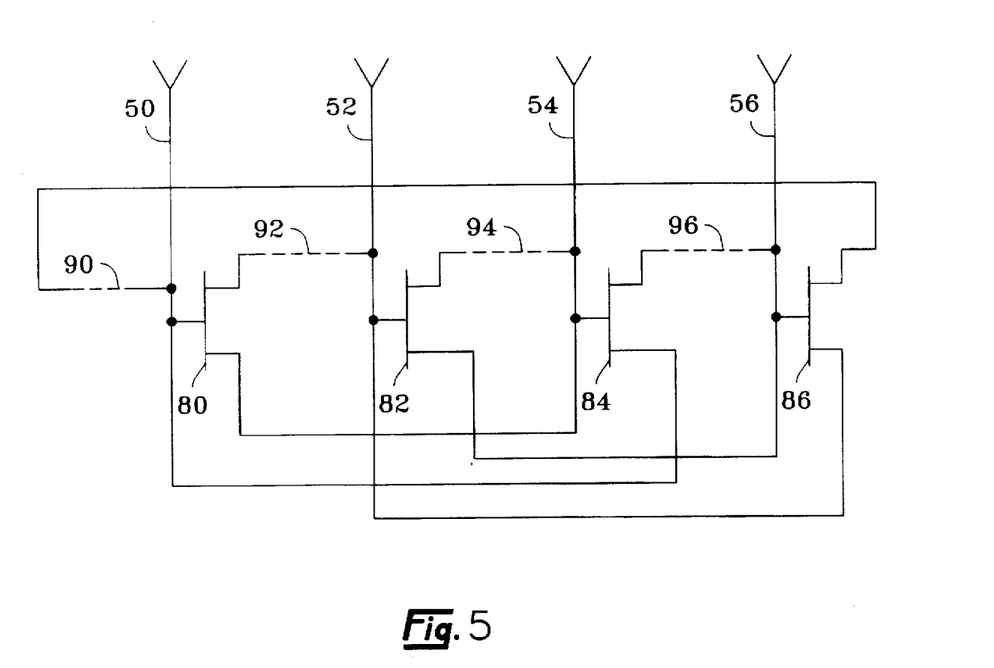
FIG. 5 is a circuit diagram for a four bit embodiment of the present invention.
Figure 6A:
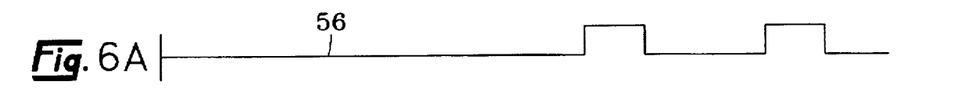
FIG. 6 is a readout diagram for the four bit embodiment of FIG. 5.
Figure 6B:
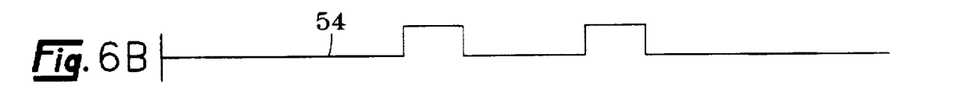
Figure 6C:
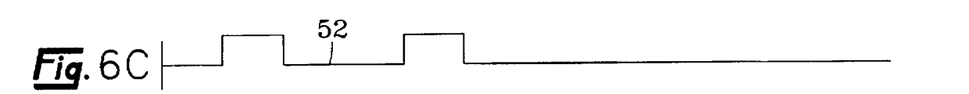
Figure 6D:
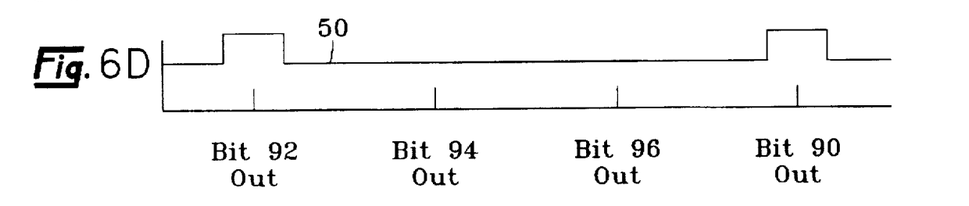

FIG. 5 illustrates a four bit embodiment of the present invention, which includes four programmable drain transistors 80, 82, 84, and 86, four address lines 50, 52, 54, and 56, and four programmed bits 90, 92, 94, and 96. Each address line 50-56 is attached to a pull up load device, and each address line 50-56 can be pulled down by the supply circuit 70 which is controlled by the printer controller (FIG. 3). To read bit 92, a pull up voltage is applied to lines 50 and 52 and the voltage level on line 54 is pulled down. If bit 92 is a short, transistor 80 will turn on and current will flow through the load device attached to line 52 and be returned on line 54, thus preventing the voltage level on line 52 from reaching a logic high level. As previously described with regard to other embodiments of the invention, the printer electronics 22 will read the logic low voltage level on line 52 and determine that bit 92 is a short. If bit 92 is a gap, line 52 will achieve a logic high voltage level and the printer electronics 22 will determine that the condition of bit 92 is a gap. When reading bit 92 line 56 may be either pulled up or down. Therefore, line 56 is effectively a "don't care" since the condition of bit 92 can be read by the printer electronics 22 regardless of the voltage level applied to line 56. In a preferred embodiment, all "don't care" address lines are pulled down to a logic low.

With continued reference to FIG. 5, bits 94, 96, and 90 are read in a manner consistent with the way bit 92 is read. To read bit 94, a pull up voltage is applied to lines 52 and 54 while line 56 is pulled down. Line 50 is a "don't care", but is preferably pulled down. Bit 96 is read by applying a pull up voltage to lines 54 and 56, pulling down line 50, with line 52 being a "don't care". Bit 90 is read by applying a pull up voltage to lines 56 and 50, pulling down line 52, and line 54 is the "don't care". This process, which is illustrated in the readout diagram of FIG. 6, is performed serially until all programmed bits 90-96 are read and provided to the printer electronics 22.

A preferred method of reading bits 90-96 employs the circuitry shown in FIG. 7. The printer electronics 22 are programmed to control the supply circuit 70 to apply pull up and pull down voltages to the address lines 50-56 in accordance with the combinations shown in the readout diagram of FIG. 6. Each of the address lines 50-56 are driven by an open collector or open drain device 132 with each line 50-56 being pulled up by a resistor 100, 102, 104, and 106. Lines are pulled down by connecting the line to ground through pull down circuit 130 controlled by printer electronics 22.

Detector 108 detects the condition of each bit that is being read and outputs on line 124 a signal corresponding to the condition of that bit. In a preferred embodiment, detector 108 includes an array of diodes 110, 112, 114, and 116, a resistor divider 118 and 120, and a voltage comparator 122. The amount of current flowing through the resistor divider 118, 120 is proportional to the number of address lines that are in a logic high state. As the FIG. 6 diagram shows, two of the address lines 100-106 will have a logic high voltage applied and two will be pulled low when reading each bit 90-96. If the particular bit being read is a gap, then current will flow into the detector 108 from the two logic high address lines. If the bit that is being read is a short, one of the address lines will not achieve a logic high voltage level so that current will flow into the detector 108 from only one address line. By monitoring the amount of current flowing from the address lines, and thereby monitoring whether the condition of the bit prevented one of the address lines from reaching a logic high, the detector determines the condition of the bit as a short or gap.

For example, to read bit 94 of FIG. 5, the readout diagram of FIG. 6 shows that lines 52 and 54 will have a pull up voltage applied and lines 50 and 56 will be pulled low. If bit 94 is a gap, transistor 82 will not conduct, thereby allowing line 54 to reach a logic high state. Current will flow from both of the pulled up lines 52, 54, through diodes 112, 114, then resistor divider 118, 120, then comparator 122 which outputs on line 124 a signal corresponding to the condition of bit 94 as a gap. If bit 94 is a short, transistor 82 will conduct and line 54 will be prevented from reaching a logic high state. In this condition, current will flow into the detector 108 only from line 52 so that less current flows to the detector 108 when the bit that is being read is a short. Comparator 122 compares the proportional voltage produced by the resistor divider 118, 120 with a comparison voltage and thereby determines, based on the lesser current flow and smaller proportional voltage produced by the resistor divider 118, 120, the condition of bit 94 as a short and a signal corresponding to that condition will be output on line 124. This process is repeated until the conditions of all bits 90-96 have been read and serially output by the detector 108 on line 124.

The printer electronics 22 receive the serial digital output 124 of the detector 108 and determines print head identifying information by comparing the received bit pattern against stored correlations of print head information. With the print head properly identified by the printer controller 26, the controller 26 is now able to reconfigure its control system algorithms to accommodate printing with the installed print head.

It is contemplated, and will be apparent to those skilled in the art from the foregoing specification, drawings, and example that modifications and/or changes may be made in the embodiments of the invention. Accordingly, it is expressly intended that the foregoing are illustrative of preferred embodiments only, not limiting thereto, and that the true spirit and scope of the present invention be determined by reference to the appended claims.

What is claimed is:

1. An identification system for providing ink jet print head identifying information in ink jet printers having ink jet print heads, comprising:

a plurality of address lines, including a first, second and third address line, for transmitting signals including voltages;

a supply circuit for applying a pull up voltage on said first and second address line;

an electronic switch having a gate connected to the first address line for turning on the switch when said supply circuit applies the pull up voltage to the first address line;

said third address line being in series connection with the second address line when said switch is on and providing a return for current flowing through the second address line;

a programmed identification circuit connected to the first, second, and third address line;

said identification circuit either preventing the second address line from reaching a logic high voltage level when said supply circuit pulls up the voltage on the first and second address line if said identification circuit is programmed with a first content, or allowing the second address line to reach a logic high voltage level when said supply circuit pulls up the voltage on the first and second address line if said identification circuit is programmed with a second bit; and a detector connected to the second address line for detecting whether the identification circuit is programmed with the first bit or the second bit by determining whether the voltage level on the second address line is a logic high or a logic low.

2. The system of claim 1 wherein said identification circuit includes a programmed line connected to said switch and connected to the second address line, said programmed line having a condition of either an electrically conducting short or a non-conducting gap and the condition of said programmed line as a short or gap determining whether the pull up voltage on the second address line produces a logic high or a logic low voltage on the second address line.

3. The system of claim 1, further comprising:

said supply circuit for applying a pull up voltage to a plurality of first and second ones of said address lines according to a predetermined pattern of corresponding first and second address lines;

a plurality of third address lines, each of said third address lines in series connection with a unique one of the second address lines and providing a return for current flowing through the second address line, producing a plurality of first, second, and third address line combinations;

said programmed identification circuit connected to each of said first, second, and third address line combinations; and said detector connected to each of the second address lines and detecting, for each of said address line combinations, whether the identification circuit is programmed with the first bit or the second bit.

4. The system of claim 1, further comprising:

a plurality of electronic switches, each of said electronic switches having a gate connected to the first address line of an address line combination for turning on the switch when said supply circuit applies the pull up voltage to said first address line; and a plurality of programmed lines, each of said plurality of programmed lines connected to a unique one of said switches and connected to a corresponding second address line, each programmed line having a condition of either an electrically conducting short or a non-conducting gap and the condition of each programmed line as a short or gap determining whether the voltage level on the second address line of each address line combination is a logic high or a logic low.

5. The system of claim 1 wherein said detector further comprises:

a first diode connected to said first address line, said first diode connected to allow current to flow from the first address line to the detector when the voltage level on the first address line is a logic high;

a second diode connected to said second address line, said second diode connected to allow current to flow from the second address line to the detector when the voltage level on the second address line is a logic high;

a voltage divider connected to said first and second diodes for producing a proportional voltage corresponding to the amount of current flowing through the first and second diodes; and a comparator for detecting the proportional voltage and comparing it the proportional voltage to a comparison voltage, producing a first output if the identification circuit is programmed with said first bit or producing a second output if the identification circuit is programmed with said second bit.

6. The system of claim 1 wherein said supply circuit further comprises:

a voltage supply; and a plurality of pull up load devices connecting said voltage supply to at least said first and second address lines.

7. The system of claim 6 wherein said detector further comprises a voltage divider connected to at least said first and second address lines and to ground, said detector producing an output corresponding to the voltage on said voltage divider.

8. An identification system for providing ink jet print head identifying information in ink jet printers having ink jet print heads, comprising:

a controller and drive circuit for transmitting signals;

a plurality of address lines for transmitting said signals from the controller and drive circuit to the ink jet print head;

a plurality of electronic switches connected to said address lines including a first electronic switch having a gate connected to a first address line for receiving a signal to turn the electronic switch on and off;

a plurality of programmed lines including a first programmed line connected to said first electronic switch and connected to a second address line, said first programmed line having a condition of either an electrically conducting short or a non-conducting gap and the condition of said first programmed line as a short or gap being at least part of a code corresponding to the ink jet print head identifying information;

a third address line connected to said first electronic switch, said first electronic switch and first programmed line forming a series connection between said second and third address line when said gate is made active by a logic high voltage on the first address line;

a pull up circuit for selectively applying a pull up voltage on selected ones of said address line;

a pull down circuit for selectively applying a pull down voltage on selected ones of said address line;

said controller being connected and programmed to control said pull up circuit and said pull down circuit to apply a pull up voltage on said first and second address line and a pull down voltage on said third address line to turn on said switch and place a voltage across the series connection of said switch and said programmed line; and a detector for detecting a current flow in said second address line and producing an output corresponding to the current flow or absence of current flow in said second address line;

said controller receiving the output of said detector and determining the condition of said programmed line, as a gap or a short, based on said detector output, and determining the print head identifying information based in part on the condition of said programmed line.

9. The system of claim 8 further comprising:

a second electronic switch having a gate connected to a fourth address line for receiving a signal to turn the second electronic switch on and off;

a second programmed line connected to said second electronic switch and connected to a fifth address line, said second programmed line being either an electrically conducting short or a non-conducting gap and the condition of said second programmed line as a short or gap being at least part of the code corresponding to the ink jet print head identifying information;

a sixth address line connected to said second electronic switch, said second electronic switch and second programmed line forming a series connection between said fifth and sixth address line;

said controller being connected and programmed to control said pull up circuit and said pull down circuit to apply a pull up voltage on said fourth and fifth address line and a pull down voltage on said sixth address line to turn on said second electronic switch and place a voltage across the series connection of said second electronic switch and said second programmed line;

at least said first and fourth address line being different so that said first and second electronic switches are separately controllable by said controller and are turned on at different times;

said detector for sequentially detecting a current flow in said second and fifth address line and sequentially producing an output corresponding to the current flow or absence of current flow in said second and fifth address line;

said controller receiving the output of said detector and determining the conditions of said first and second programmed lines, as gaps or shorts, based on said detector output, and determining the print head identifying information based in part on the conditions of said first and second programmed lines.

10. The system of claim 9 further comprising:

a third electronic switch having a gate connected to a seventh address line for receiving a signal to turn the third electronic switch on and off;

a third programmed line connected to said third electronic switch and connected to an eighth address line, said third programmed line being either an electrically conducting short or a non-conducting gap and the condition of said programmed line as a short or gap being at least part of the code corresponding to the ink jet print head identifying information;

a ninth address line connected to said third electronic switch, said third electronic switch and programmed line forming a series connection between said eighth and ninth address lines;

said controller being connected and programmed to control said pull up circuit and said pull down circuit to apply a pull up voltage on said fourth and fifth address lines and a pull down voltage on said sixth address line to turn on said third electronic switch and place a voltage across the series connection of said third electronic switch and said third programmed line;

at least said first, fourth, and seventh address lines being different so that said first, second, and third electronic switches are separately controllable by said controller and are turned on at different times;

said detector for sequentially detecting a current flow in said second, fifth, and eighth address lines and sequentially producing an output corresponding to the current flow or absence of current flow in said second, fifth, and eighth address lines;

said controller receiving the output of said detector and determining the condition of said first, second, and third programmed lines, as gaps or shorts, based on said detector output, and determining the print head identifying information based in part on the conditions of said first, second, and third programmed lines.

11. The system of claim 8 wherein said detector further comprises:

a first diode connected to said first address line, said first diode connected to allow current to flow from the first address line to the detector when the voltage level on the first address line is a logic high;

a second diode connected to said second address line, said second diode connected to allow current to flow from the second address line to the detector when the voltage level on the second address line is a logic high;

a voltage divider connected to said first and second diodes for producing a proportional voltage corresponding to the amount of current flowing through the first and second diodes; and a comparator for receiving the proportional voltage and comparing the proportional voltage to a comparison voltage, producing a first output if current is flowing from the second address line into the detector or producing a second output if current is not flowing from the second address line into the detector.

12. An ink jet print head identification circuit integrated onto an ink jet print head cartridge chip for providing identifying information relating to the characteristics of the print head to the electronics of an ink jet printer, said chip having print head array electronics connected to a plurality of address lines with each address line connected to a separate pull up device within the printer electronics, the identification circuit comprising:

a plurality of programmed electronic switches; and a plurality of programmed lines each of said programmed lines connected to a unique one of said switches and connected to a unique one of said address lines, each programmed line having a condition of either an electrically conducting short or a non-conducting gap and the condition of each programmed line as a short or gap determining the programming of each switch;

wherein each of said electronic switches is interconnected with other electronic switches and address lines so that the programmed line corresponding to each electronic switch is read by the printer electronics from said unique one of the address lines in response to applying a pull up voltage to at least two of the address lines.

13. The circuit of claim 12, further comprising a detector connected to each of said unique ones of the address lines for detecting the programming of each electronic switch as either a short or gap by determining whether the voltage level on each of said unique ones of the address lines is a logic high or a logic low.

14. The circuit of claim 12 wherein each of said electronic switches comprises a transistor, each transistor comprising:

a gate connected to a first address line and a programmed drain of another transistor;

a source connected to a third address line and the gate of another transistor; and a programmed drain connected to a second address line and the gate of another transistor.

15. A method for providing ink jet print head identifying information to an ink jet printer having printer electronics and an ink jet print head, the print head including an integrated circuit having print head array electronics, an identification circuit, and a plurality of address lines interconnecting the identification circuit and printer electronics, the method comprising the steps of:

programming a digital code having one or more bits into the identification circuit, each bit of the code being programmed as either an electrically conducting short or a non-conducting gap, the digital code corresponding to the print head identifying information;

transmitting the digital code in serial fashion to a bit detector where each bit of the digital code is transmitted by:

applying a pull up voltage to two of the address lines, producing two pull up address lines;

pulling down a voltage on a third address line that is in series connection with one of the two pull up address lines;

detecting whether a logic high or a logic low voltage is present on one of the two pull up address lines; and outputting a signal corresponding to whether a logic high or a logic low voltage was detected; and reading a condition of the bit, as a gap or a short, by the printer electronics based on the output signal.

16. The method of claim 15, further comprising the step of determining the print head identifying information by the printer electronics based on the condition of each bit.

\* \* \* \* \*